United States Patent [19]

Hsu

[11] 3,951,812
[45] Apr. 20, 1976

[54] WATER EXTRACTOR

[76] Inventor: Charles Jui-Cheng Hsu, Box 460, Grand Central Station, New York, N.Y. 10017

[22] Filed: Dec. 30, 1974

[21] Appl. No.: 537,343

Related U.S. Application Data

[63] Continuation-in-part of Ser. No. 379,735, July 16, 1973, abandoned.

[52] U.S. Cl. ............................ 210/282; 73/61.1 R; 116/114 R; 210/502; 210/DIG. 5
[51] Int. Cl.² ........................................ B01D 27/02
[58] Field of Search ............. 23/267 A; 33/126.7 R; 73/61.1 R; 116/114 R, 124 R, 130, 134, DIG. 33; 206/.5; 210/41, 85, 86, 96, 265, 282, 502, DIG. 5; 229/60, 62

[56] References Cited
UNITED STATES PATENTS

| | | |
|---|---|---|
| 2,332,902 | 10/1943 | D'Angremond et al. ......... 210/41 X |
| 2,842,152 | 7/1958 | Winter et al. ...................... 210/96 X |
| 2,934,409 | 4/1960 | Biehl ................................. 23/267 A |
| 3,441,140 | 4/1969 | Thurber .......................... 210/282 X |
| 3,528,546 | 9/1970 | McPherson .......................... 210/96 |
| 3,744,639 | 7/1973 | Teeple, Jr. et al. ............. 210/282 X |

Primary Examiner—Charles N. Hart
Assistant Examiner—Robert H. Spitzer

[57] ABSTRACT

An improved device for soaking up water that is collected in the bottom of an oil tank, and removing the water therefrom; the device comprising a porous envelope lowered by a tethering line to the tank bottom, the envelope containing sinking weights and Sterculia Lychncphora Hance powder which is unaffected by oils but which readily absorbs water in great volume by being expandable to over fifteen times its original size when fully saturated, thus effectively removing the water when the device is lifted from the tank.

2 Claims, 10 Drawing Figures

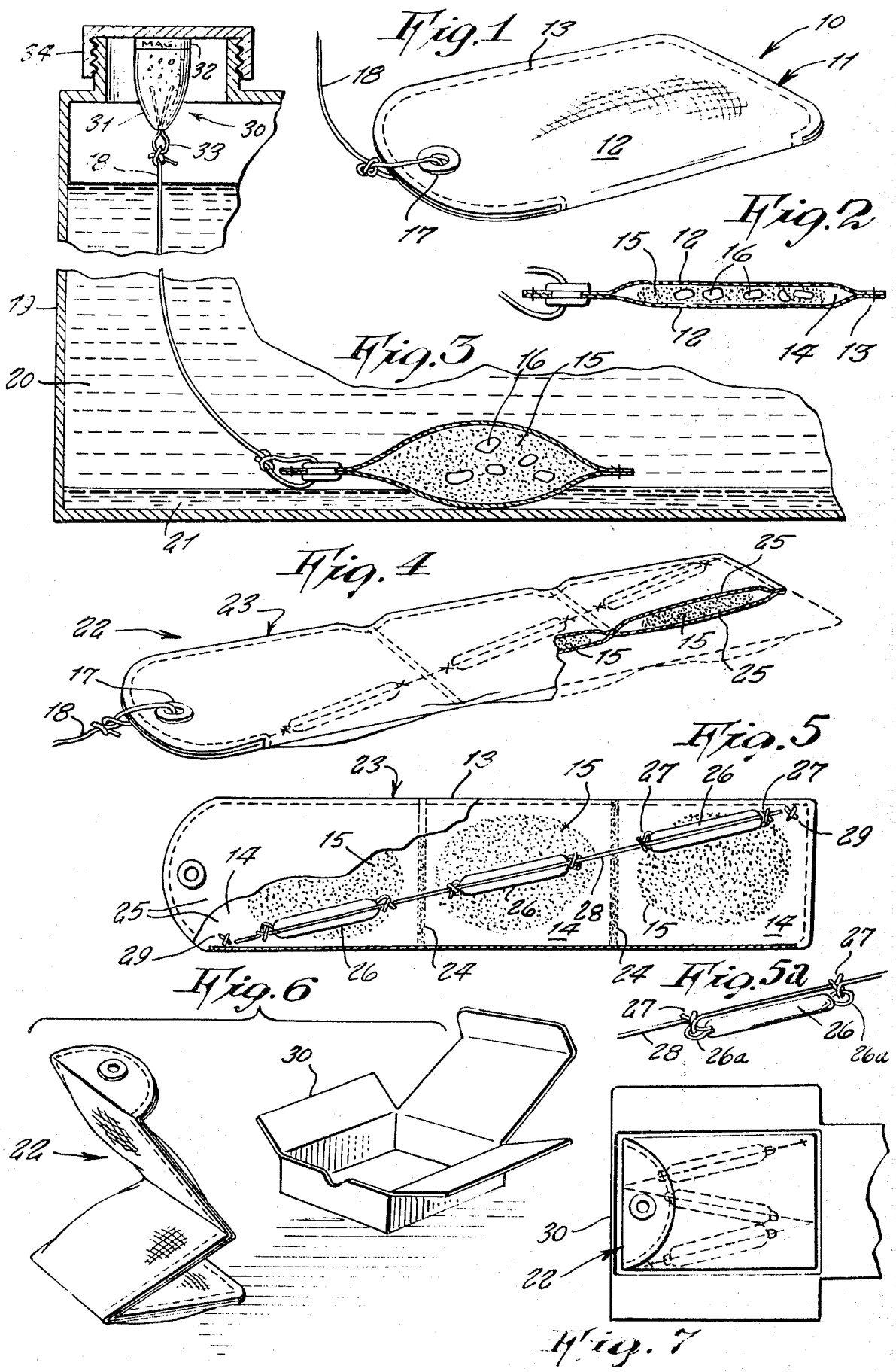

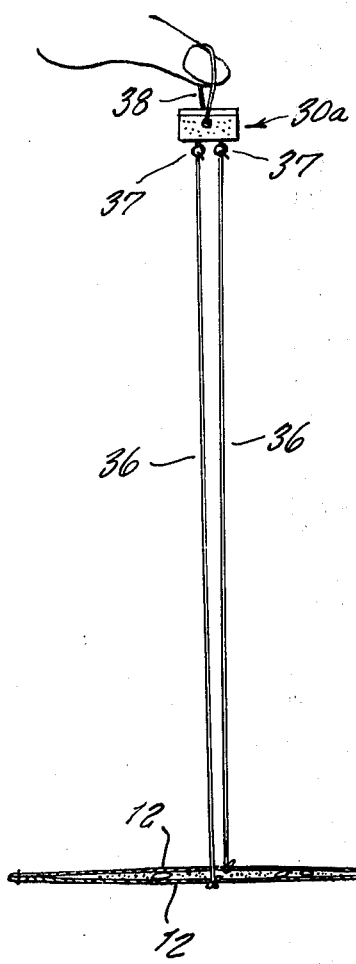
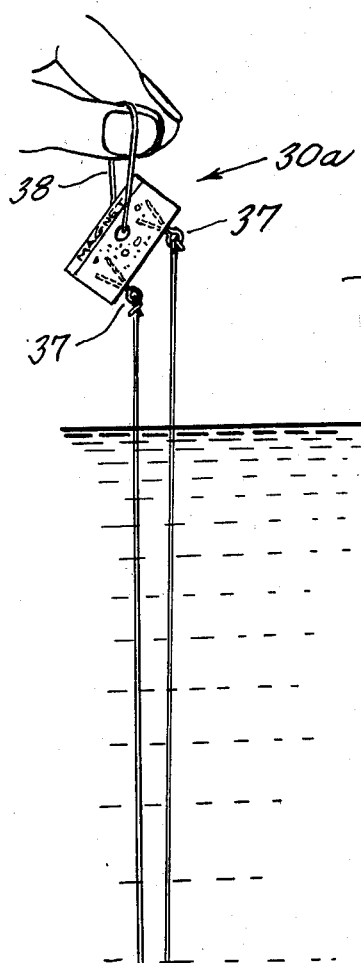

WATER EXTRACTOR

This invention relates generally to water absorbing devices, and is a continuation in part of applicant's presently pending U.S. Pat. application filed on July 16, 1973, for a WATER-FROM-OIL-SOAKER, Ser. No. 379,735, now abandoned.

It is well known that it is difficult to remove all the water that is present in the bottom of an oil storage tank, particularly when the tank is deep and the water quantity may be very shallow. Accordingly, there is a need for a simple device to overcome this situation.

Therefore, it is a principal object of the present invention to provide a water absorbing device for storage tank wherein even a relatively thin water film on the tank bottom will be easily soaked up for extraction from the tank.

Another object is to provide a water extracting device of novel design so that it will lay flat against the tank bottom.

Yet another object is to provide a water extracting device which will not lean upright against the tank side wall in case it lands in a corner of the tank.

Yet a further object is to provide a water extracting device that more thoroughly removes all the water and with less effort than the job of pumping out a tank bottom.

Yet another object is to provide a water extracting device that folds into a compact shape for being stored in a minimum sized box for shipment from a manufacturer to a user.

Other objects are to provide a water extracting device which is simple in design, inexpensive to manufacture, rugged in construction, easy to use, and efficient in operation.

These and other objects will be readily evident upon a study of the following specification and the accompanying drawing, wherein:

FIG. 1 is a perspective view of one form of the invention that includes only one pocket.

FIG. 2 is a cross-sectional view on line 2—2 of FIG. 1 and showing the device in a dry condition, prior to use.

FIG. 3 is a similar view thereof illustrated in use, and shown distended with absorbed water.

FIG. 4 is a perspective view shown partly in cross section and illustrating a modified design of the invention that is long and includes three pockets.

FIG. 5 is a top plan view thereof shown with a portion of the top panel broken away so to illustrate the interior structure.

FIG. 5a is a detail thereof shown in perspective.

FIG. 6 shows the extractor being folded for fitting in a small box.

FIG. 7 is a top view thereof fully folded within the opened box.

FIGS. 8 and 9 show another design of the invention.

Referring now to the drawing in detail, and more particularly to FIG. 1 to 3 at this time, the reference numeral 10 represents a water extractor according to the present invention, wherein there is a flat sack 11 made of a porous fabric or the equivalent, made from a single part that is folded over at its center so to form upper and lower panels 12 which are stitched together at their edges by a thread 13 so to form a pocket 14 therebetween. Before the pocket is fully closed, a quantity of finely pulverized Sterculia Lychnophora Hance 15 is placed therewithin together with a few pieces of metal weights 16. The Sterculia Lychnophora Hance is derived from a botanical plant growing in the Orient, and which when dried and pulverized has the property of being expandable to over fifteen times in water. As described in applicant's previous U.S. Pat. No. 3,745,659, this powder is first presoaked in water, then dried and then broken up so that the resultant powder is four times faster in its water absorption, due to the pre-soaking step in its manufacture. Thereafter, the pocket is sewn completely closed, and a grommet 17 is secured through both panels at one end of the sack, so a tethering line 18 can be secured thereto.

In use, as shown in FIG. 3, the water extractor is lowered by line 18 into a tank 19 that contains any type of oil 20, and the extractor 10 due to weights 16 rests upon the tank bottom where water 21 may have collected. As the water extractor is lowered through the oil, the powder 15 is not affected by the oil, but when contacted by the water, the water is absorbed thereby. Thus the water in a tank bottom can be soaked or blotted up and then removed when the extractor 10 is pulled out after a period of time.

After use, the extractor can be dried out in the atmosphere, so it is adaptable for subsequent re-use.

In FIGS. 4 to 7 a modified design of water extractor 22 is shown which is of larger size for handling a bigger quantity of water, and which comprises an elongated, rectangular, flat sack 23 made of a similar porous fabric material folded over and stitched at 13, but which additionally includes a row of pockets 14 separated from each other by a transverse line of water soluble adhesive 24 located between upper and lower panels 25. The adhesive prevents the Sterculia Lychnophora Hance 15 in each pocket to join each other so that the sack remains bendable or flexible in length, whereby when it is lowered into a tank, it will not be stiff throughout its length and lean upright against a tank wall in case it lands in a corner, so that thus being made bendable it is certain to collapse down and rest on the bottom.

As best shown in FIG. 5, before the pockets 14 are filled with powder 15 and stitched, a series of spaced apart, elongated sinkers 26, having an eye 26a at each end, are each secured by knots 27 to a single string 28 intended to be enclosed in the sack and which at its opposite ends is secured by a stitch and knot 29 to the sack fabric material. The string is positioned so that when the sack is completed, it extends diagonally taut between diagonally opposite corners thereof, and each sinker is located diagonally within one of the pockets 14.

Accordingly, after the extractor 22 is completed in manufacture, it can be readily folded over, as shown in FIG. 6, and fitted into a minimum thickness of box 30 because the diagonal line of sinkers does not rest one upon another but falls next to each other, as shown in FIG. 7.

Also, in use, the diagonal line of sinkers will cause the entire bottom panel of the sack to rest against the tank bottom, in a better manner than if it were only along a center of the pockets or along one side only thereof whereby the other side might tend to float up off the tank bottom.

The extractor 22 includes a grommet 17 and string 18 similar to the soaker 10 as above described.

As shown in FIG. 3, the end of the line 18 can be attached to a hand-graspable member 30 designed to be easily accessible when the extractor is wished to be pulled out of the tank. The member includes a cork body 31 on one end of which a permanent magnet 32 is secured. A cotter pin eye 33 at the other end of the cork body is provided for the line attachment. Thus the member can be either magnetically attached to a cap 34 of the tank opening so to be easily reached, or it may simply be left to float on the oil surface, where it can be picked up.

In FIGS. 8 and 9, a modified design of extractor 35 has two tethering lines 36 of non-stretchable material, one of which is attached to a top panel of a pocket, while the other extends through the pocket and is attached to the pocket lower panel. The other ends of the lines are attached to spaced apart eyes 37, a member 30a consisting of a cork body and magnet as above described.

In this form of the invention, a person can readily see if, and how much, water is being absorbed by the extractor, without need to lift it out of the tank, because prior to soaking of the powder 15, the lines hold member 30a in a horizontal position, when the lines are lightly pulled taut, (as shown in FIG. 8) but after soaking, the spread apart lower and upper pocket panels cause the member 30a to be tilted at an angle. A convenient looped string 38 allows holding member 30a without affecting its tilt measuring.

While various changes may be made in the detail construction, it is understood that such changes will be within the spirit and scope of the present invention, as is defined by the appended claims:

I claim:

1. In a water extractor, the combination of a sack comprised of porous material, said sack containing weights and a quantity of pulverized Sterculia Lychnophora Hance having the characteristic of absorbing water but not absorbing oil, a grommet secured at one end of said sack, and a tethering line secured to said grommet; said sack being of elongated, flat, rectangular shape, and including a row of closed, separate pockets, each one of which contains a single weight and a quantity of said Sterculia Lychnophora Hance, said weights being secured along a single string that extends diagonally between diagonally opposite corners of said sack, the ends of said string being secured within said corners, said sack being readily longitudinally flexible and bendable at areas between said pockets, so that when folded up for packaging, said weights are positioned adjacent each other so to maintain said folded sack relatively flat, and a pair of tethering lines being secured at their one ends to said extractor and opposite ends being secured to a graspable member, one of said line ends secured to said extractor being secured to an upper panel of a pocket thereof, while the other said line has said end extending through said pocket and being secured to a lower panel thereof.

2. In a water extractor, the combination of a sack comprised of porous material, said sack containing weights and a quantity of pulverized Sterculia Lychnophora Hance having the characteristic of absorbing water but not absorbing oil, a grommet secured at one end of said sack, and a tethering line secured to said grommet; said sack being of elongated, flat, rectangular shape, and including a row of closed, separate pockets, each one of which contains a single weight and a quantity of said Sterculia Lychnophora Hance, said weights being secured along a single string that extends diagonally between diagonally opposite corners of said sack, the ends of said string being secured within said corners, said sack being readily longitudinally flexible and bendable at areas between said pockets, so that when folded up for packaging, said weights are positioned adjacent each other so to maintain said folded sack relatively flat, and a pair of tethering lines being secured at their one ends to said extractor, one of said line ends secured to said extractor being secured to an upper panel of a pocket thereof, while the other said line has said end extending through said pocket and being secured to a lower panel thereof.

* * * * *